(12) United States Patent
Lin

(10) Patent No.: US 7,606,285 B2
(45) Date of Patent: Oct. 20, 2009

(54) CHUCK DEVICE FOR ELECTRICAL DISCHARGE MACHINE

(76) Inventor: Chien-Chih Lin, No. 6-2, Lane 207, Jhangshuei Rd., Changhua County (TW) 50071

( * ) Notice: Subject to any disclaimer, the term of this patent is extended or adjusted under 35 U.S.C. 154(b) by 770 days.

(21) Appl. No.: 11/368,498

(22) Filed: Mar. 7, 2006

(65) Prior Publication Data

US 2006/0239326 A1    Oct. 26, 2006

(30) Foreign Application Priority Data

Apr. 20, 2005    (TW) .............................. 94206184 U

(51) Int. Cl.
*H05B 7/06* (2006.01)
*B23B 31/10* (2006.01)
*B25G 3/22* (2006.01)
*B23H 1/04* (2006.01)

(52) U.S. Cl. ...................... 373/88; 279/4.06; 279/4.04; 279/20; 279/75; 279/905; 219/69.15

(58) Field of Classification Search ................ 279/4.06, 279/40.04, 20, 75, 905; 373/88; 219/69.15
See application file for complete search history.

(56) References Cited

U.S. PATENT DOCUMENTS 3,943,778 A  *  3/1976  Wyse ........................... 74/5 F
5,791,803 A  *  8/1998  Nordquist ..................... 403/13
5,906,378 A  *  5/1999  Nordquist ................... 279/4.06
6,160,236 A  * 12/2000  Nordquist ................. 219/69.15
6,642,469 B2 * 11/2003  Dobovsek et al. ......... 219/69.14
2006/0014423 A1* 1/2006  Fan ............................. 439/567

FOREIGN PATENT DOCUMENTS

JP    2001245529 A  *  9/2001

* cited by examiner

*Primary Examiner*—Tu B Hoang
*Assistant Examiner*—Ket D Dang

(57) ABSTRACT

A chuck device for electrical discharge machine includes a mold fixed to the machine and a connector connected to the discharge head. The connector has a connection rod having a neck and the connection rod is connected to the mold. A plurality of protrusions extend from the top of the connector and each protrusion has a groove which is defined by two facing inclined surfaces. The mold has a plurality of positioning bars fixed to an underside thereof and each positioning bar has a taper-shaped body with two inclined sides. The positioning bars are engaged with the grooves and the two inclined sides of the positioning bar are in contact with the inclined surfaces of the groove. A distance is defined between the flanges and a top of the protrusion.

2 Claims, 10 Drawing Sheets

CHUCK DEVICE FOR ELECTRICAL DISCHARGE MACHINE

FIELD OF THE INVENTION

The present invention relates to a chuck device which includes a mold fixed to the machine and a connector connected to the discharge head, wherein the connector provides larger contact area to prevent separation of the mold and the connector.

BACKGROUND OF THE INVENTION

A conventional electric discharge machine includes a chuck device as shown in FIGS. 5 to 7 and generally includes a connector 7 connected with a discharge head (not shown) and a mold 60 which is fixed to the machine. The connector 50 includes a plurality of protrusions 52 extending along a periphery of a top thereof and a connection rod 51 is located at a center of the top of the connector 50. The connection rod 51 includes a neck 511 and each of the protrusions 52 includes a substantially U-shaped recess 53 defined in a top thereof. Each recess 53 includes two inclined surfaces 531 which face each other. The mold 60 has a central hole 61 with which the connection rod 51 is engaged. A plurality of positioning circular bars 62 are fixed to an underside of the mold 60 by bolts and engaged with the recesses 53.

As shown in FIG. 7, the positioning circular bars 62 are in contact with the two inclined surfaces 531 such that the connector 50 and the mold 60 do not have any relative rotational movement. During discharging processes, the object to be machined applies a reaction force to the discharge head and the neck 511 of the connection rod 51 is broken if the reaction force is too large. The positioning circular bars 60 then slide along the inclined surfaces 531 to remove from the recesses 53 so as to protect the mold 60 from being damaged. However, the contact areas between the positioning circular bars 62 and the inclined surfaces 531 are so limited so that the contact areas cannot bear too much stress, the connector 50 and the mold 60 might be separated by a force over a certain level and this usually causes delay to the procedures.

Another conventional chuck device is disclosed in FIGS. 8 to 10, wherein the connector 70 includes several recesses 72 defined in a top 71 thereof and a connection rod 701 extends from the top 71. A plurality of L-shaped plates 73 are connected to protrusions on the top 71 of the connector 70 and each plate 73 includes two openings 731 which face the recesses 72 and have the same width as the recesses 72. A gap 74 is defined between the top 71 and the plate 73. The mold 80 includes blocks 81 extending from an underside thereof and the blocks 81 are inserted in the recesses 72 and in contact with peripheries of the openings 731 as shown in FIGS. 9 and 10.

In the connection between the connector 70 and the mold 80, the blocks 81 are in contact with the vertical peripheries of the openings 731 so that the contact area is very limited. When the neck 702 of the connection rod 701 is broken, the limited area cannot share too much force for the neck 702.

The present invention intends to provide a chuck device for electrical discharge machine wherein the contact areas between the positioning bars on the mold and the recesses in the connector and for engaging the positioning bars are large enough so that the neck of the connection rod is not broken easily.

SUMMARY OF THE INVENTION

The present invention relates to a chuck device for electrical discharge machine and the chuck device comprises a connector having a connection rod extending from the top of the connector. The connection rod has a neck and the connection rod is inserted into a central hole defined in a mold. A plurality of protrusions extend from the top of the connector and each protrusion has a groove defined in a top thereof. Each groove is defined by two facing inclined surfaces. The mold has a plurality of positioning bars fixed to an underside thereof and each positioning bar has a taper-shaped body. Two flanges extend from two sides of the positioning bar and a width between the two flanges is wider than a width of the taper-shaped body. The taper-shaped body includes two inclined sides. The positioning bars are engaged with the grooves and the two inclined sides of each of the positioning bars are in contact with the inclined surfaces of the groove corresponding thereto. A gap is defined between an inner side of the groove and an underside of the taper-shaped body, and a distance is defined between the flanges and a top of the protrusion.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
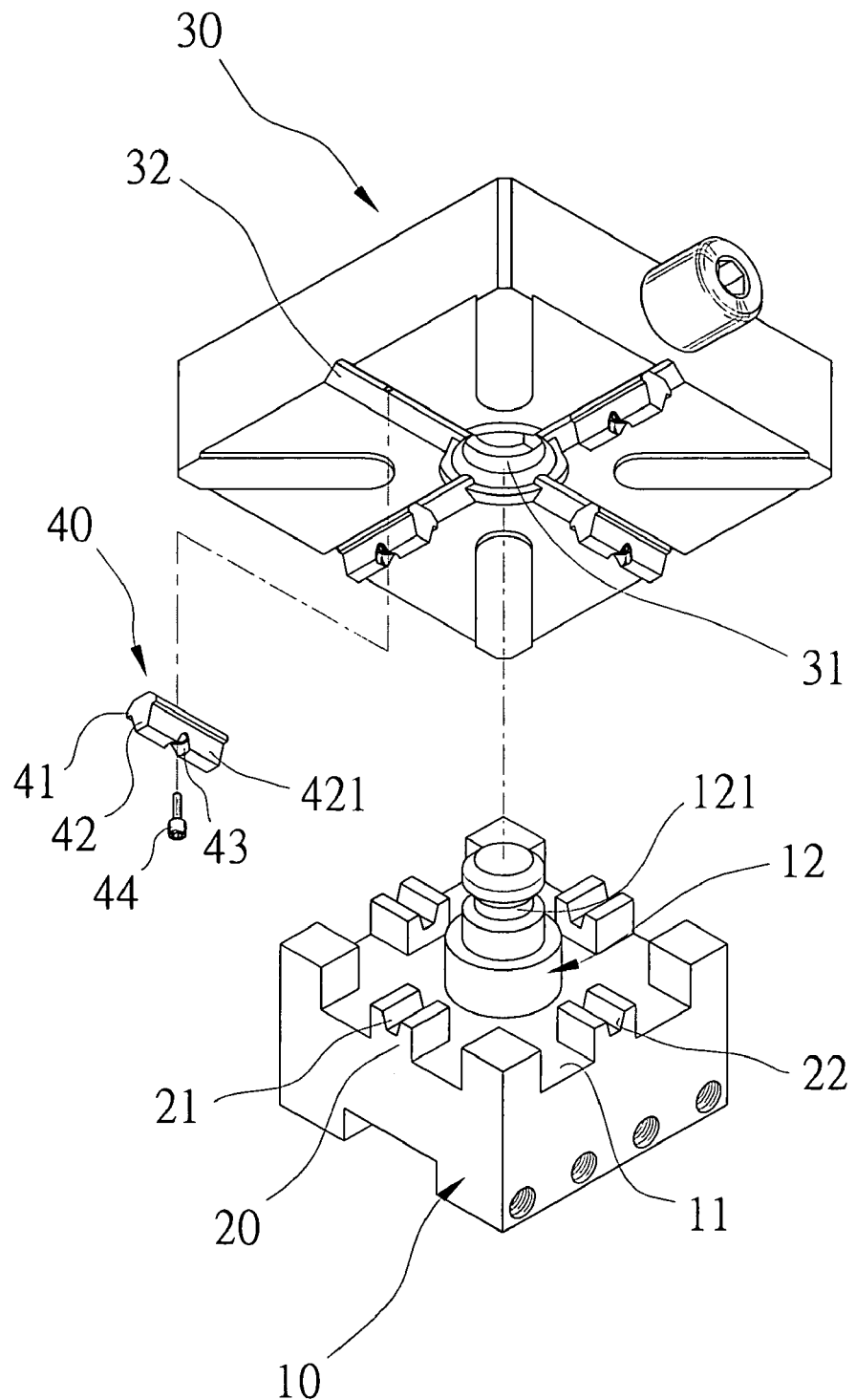
FIG. 1 is an exploded view to show the chuck device of the present invention.
Figure 2:
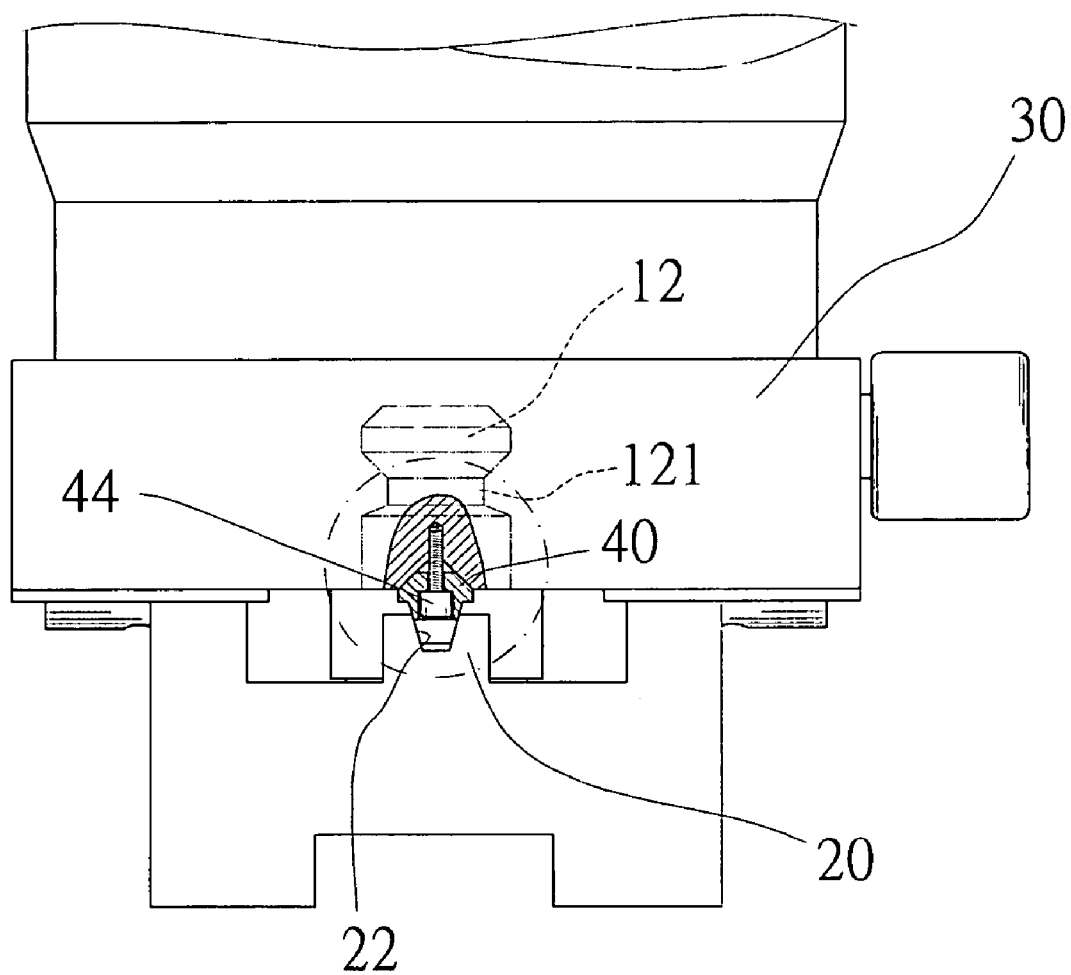
FIG. 2 shows that the mold and the connector are connected with each other, each of the protrusions is engaged with the groove corresponding thereto.
Figure 3:
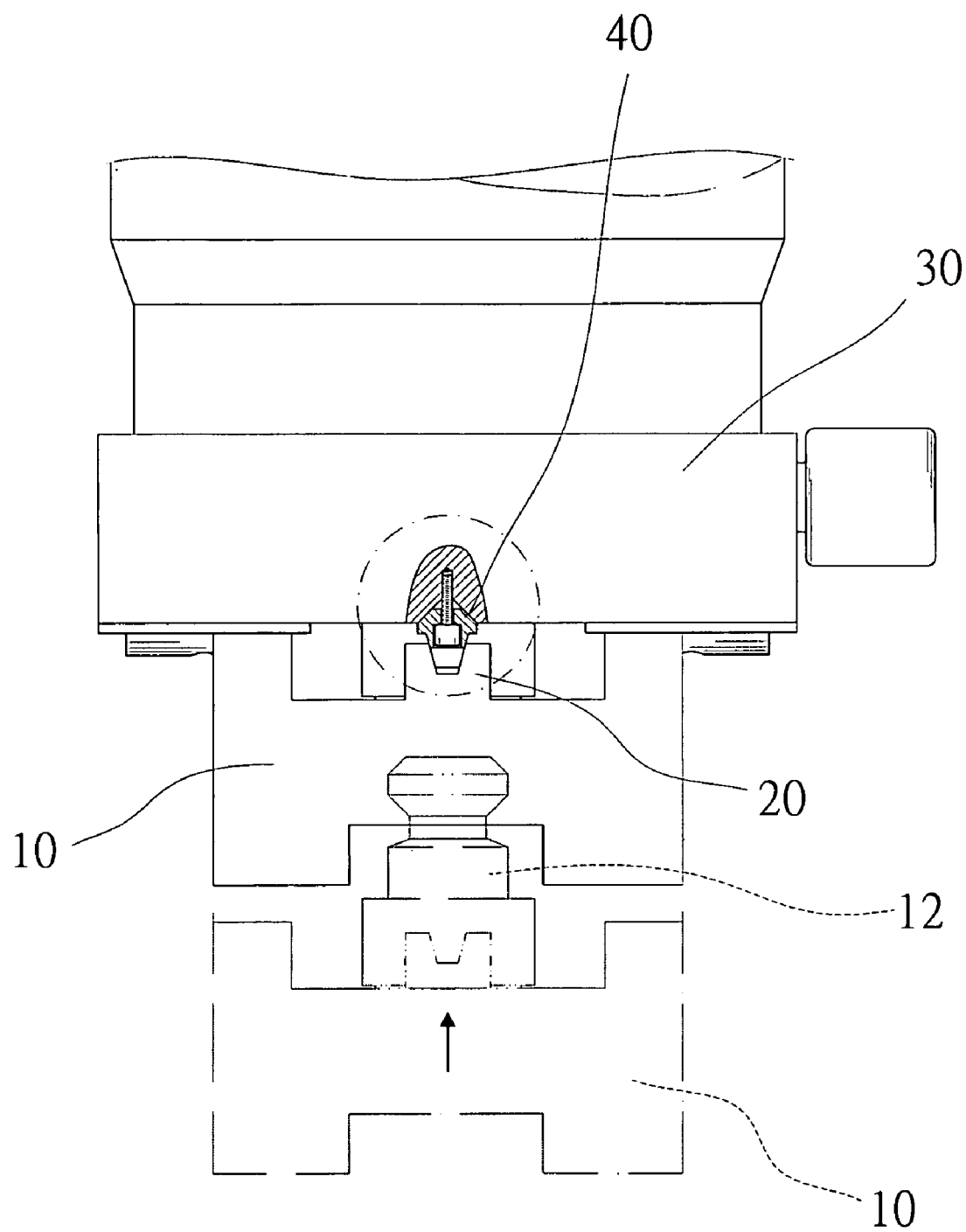
FIG. 3 shows the connector is moved upward to connect the mold.
Figure 4:
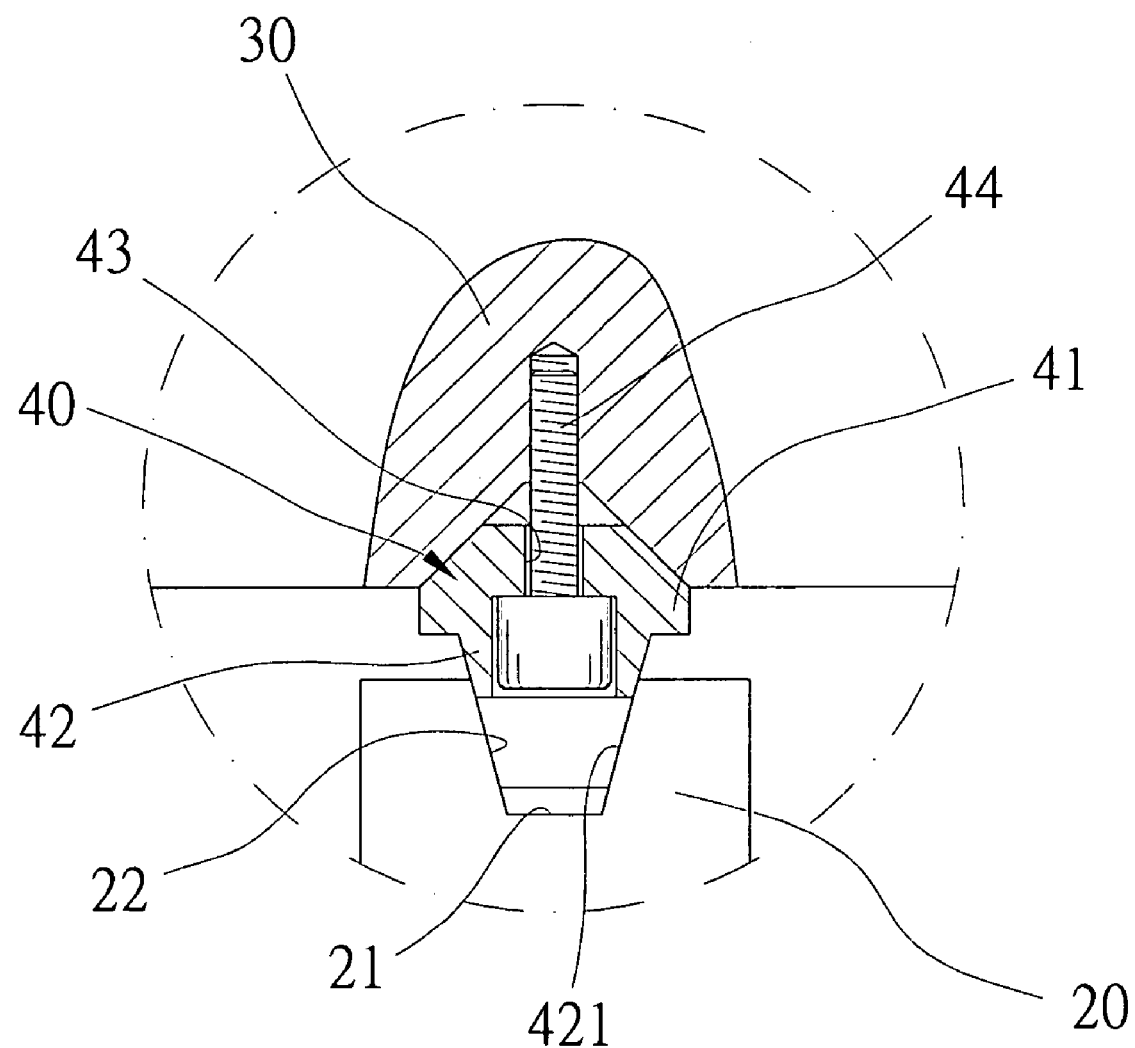
FIG. 4 is an enlarged cross sectional view to show the positioning bar engaged with the groove.
Figure 5:
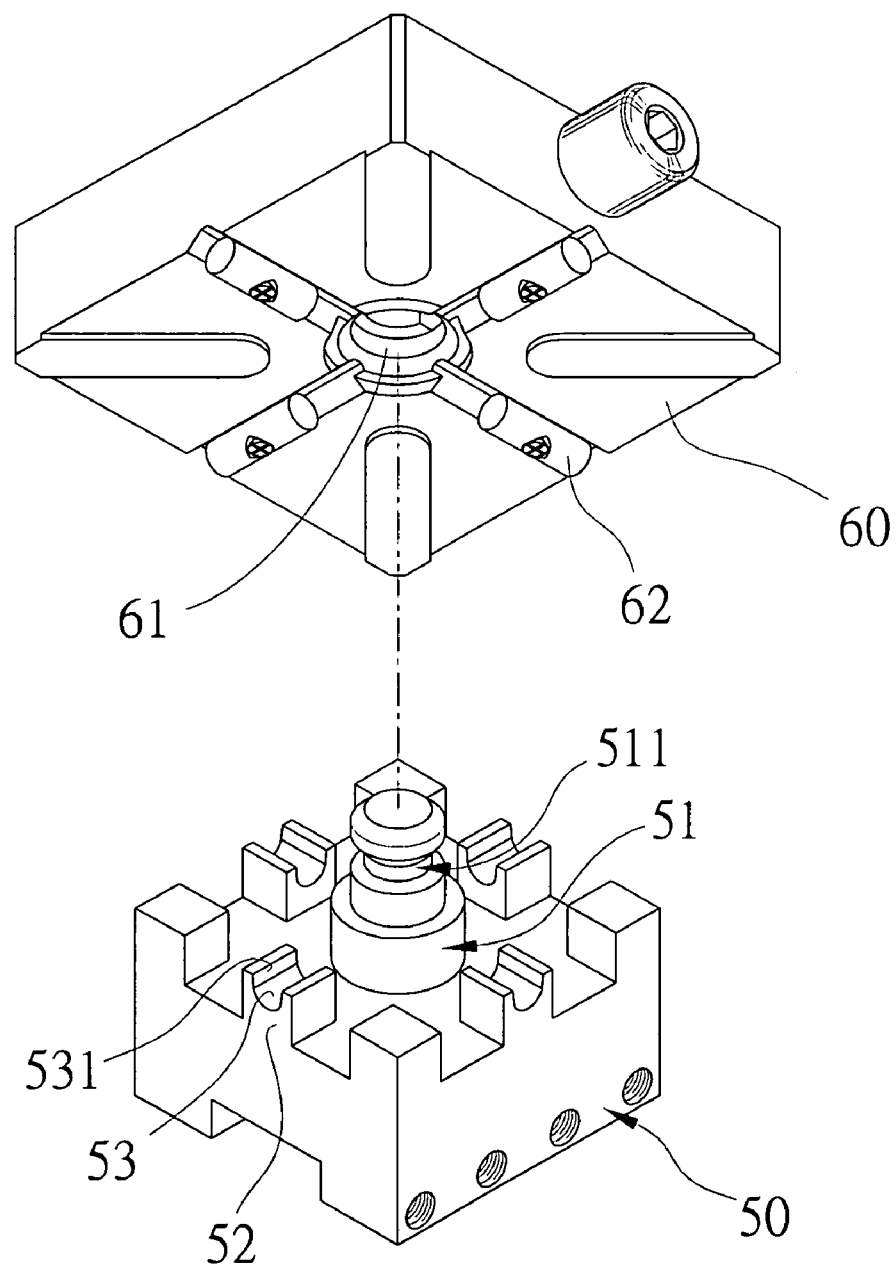
FIG. 5 is an exploded view to show a conventional chuck device.
Figure 6:
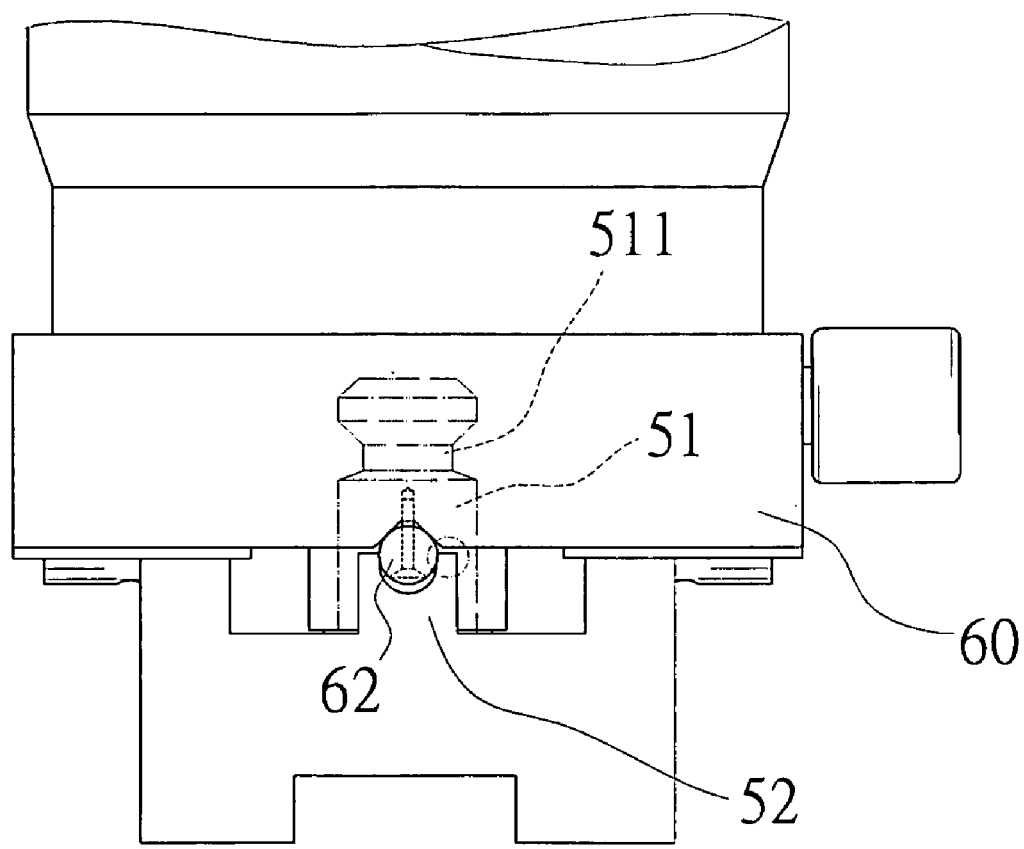
FIG. 6 shows the conventional mold and the conventional connector are connected with each other.
Figure 7:
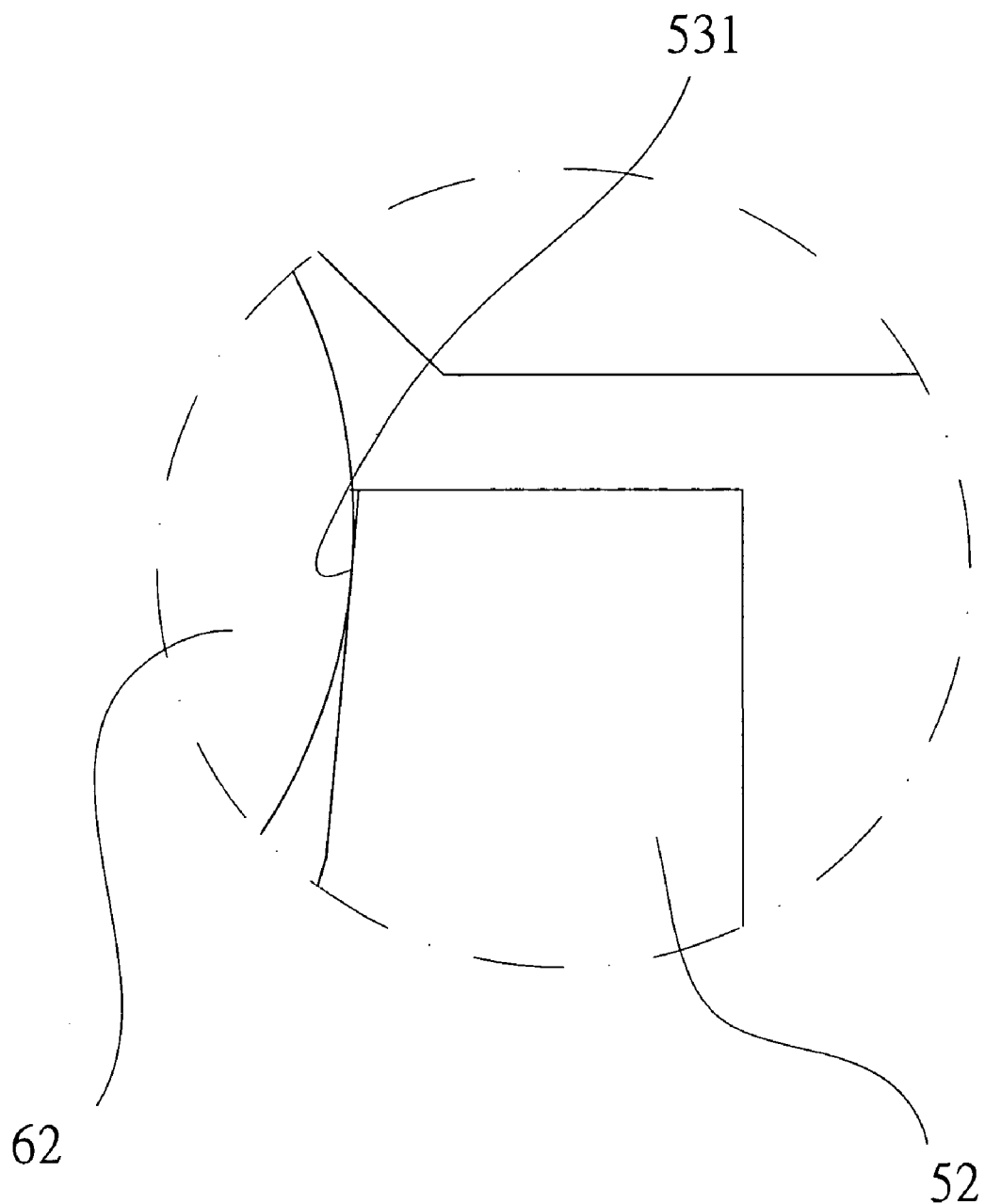
FIG. 7 is an enlarged view to show that the positioning circular bar of the conventional mold is in contact with the two inclined surfaces of the recess of the conventional connector.
Figure 8:
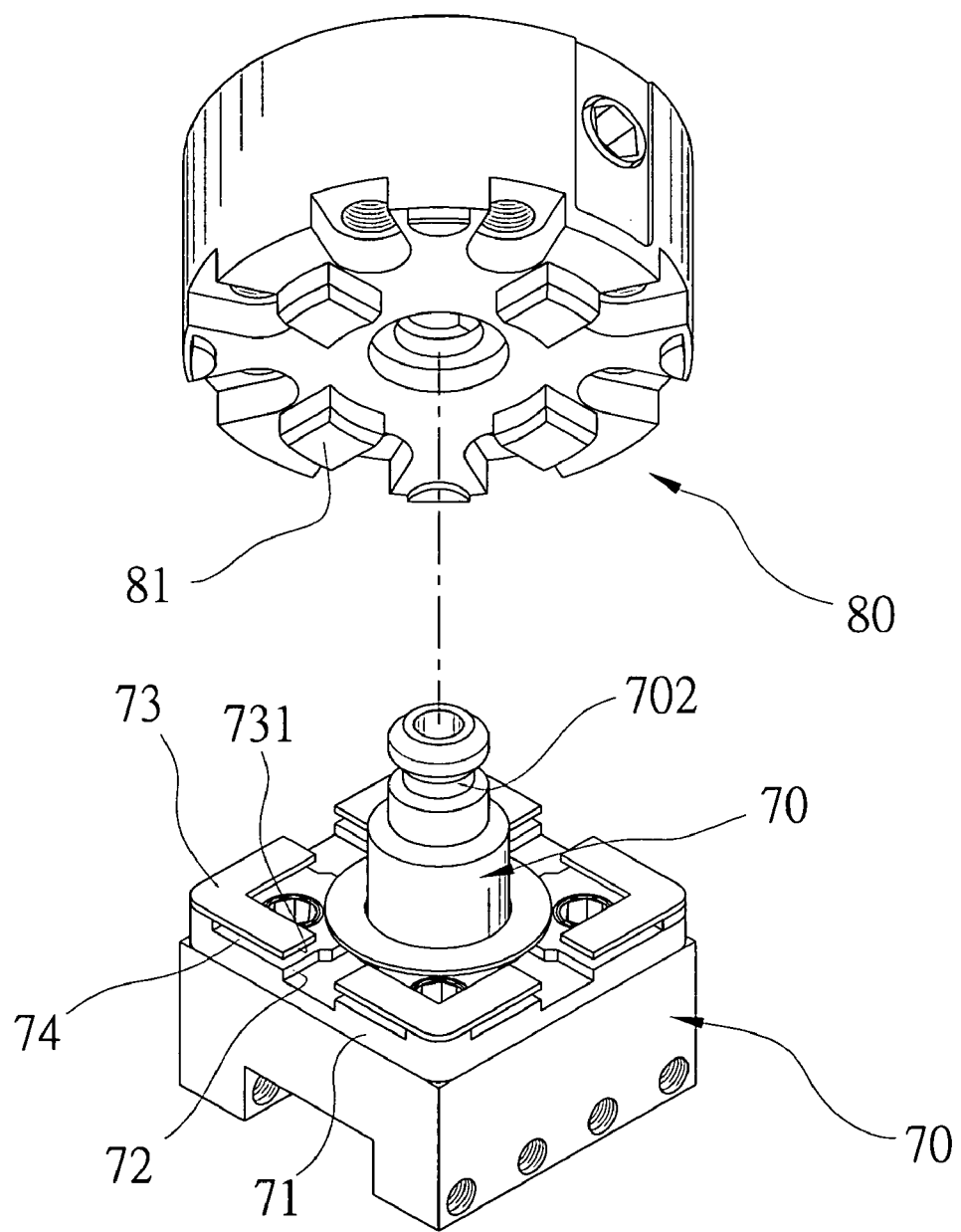
FIG. 8 is an exploded view to show a second conventional chuck device.
Figure 9:
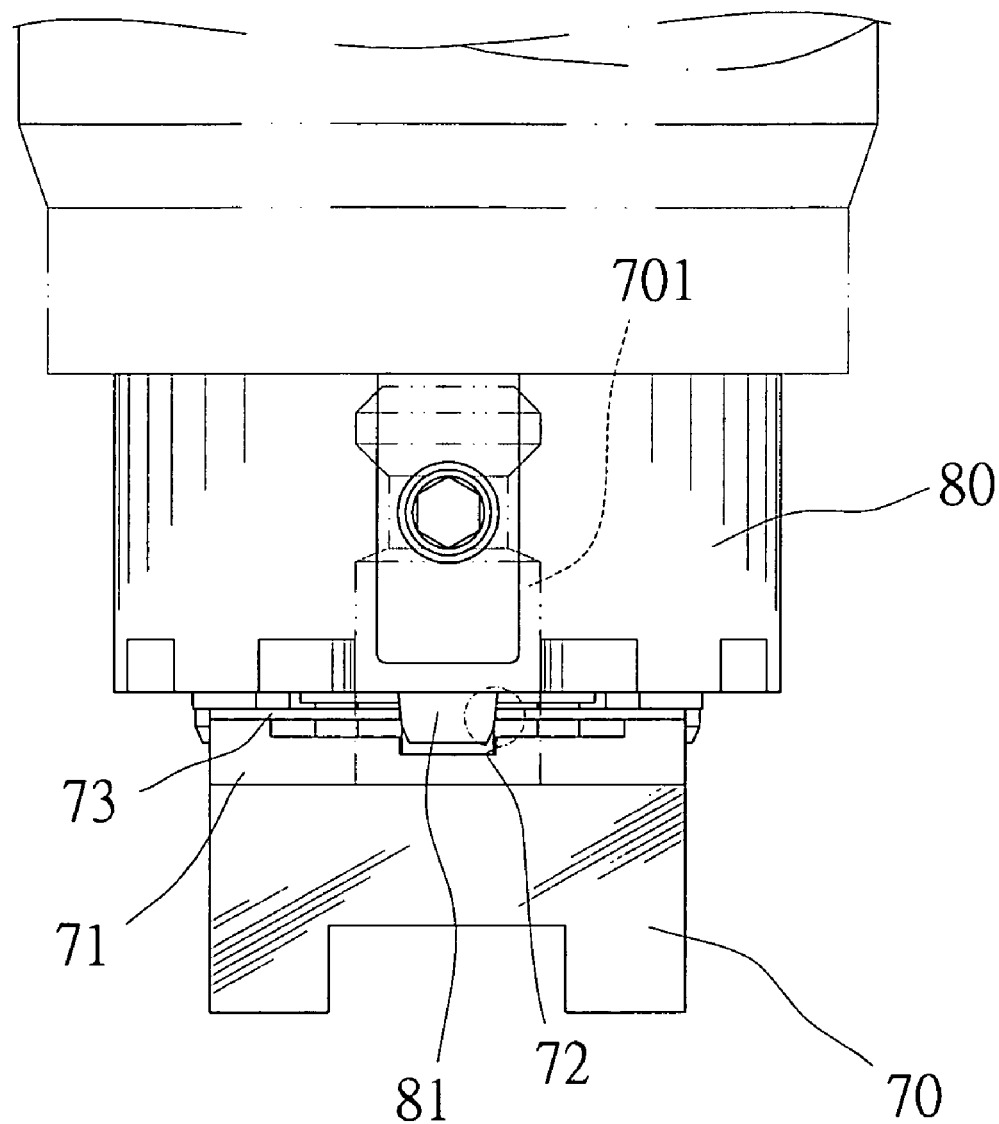
FIG. 9 shows the conventional mold and the conventional connector in FIG. 8 are connected with each other.
Figure 10:
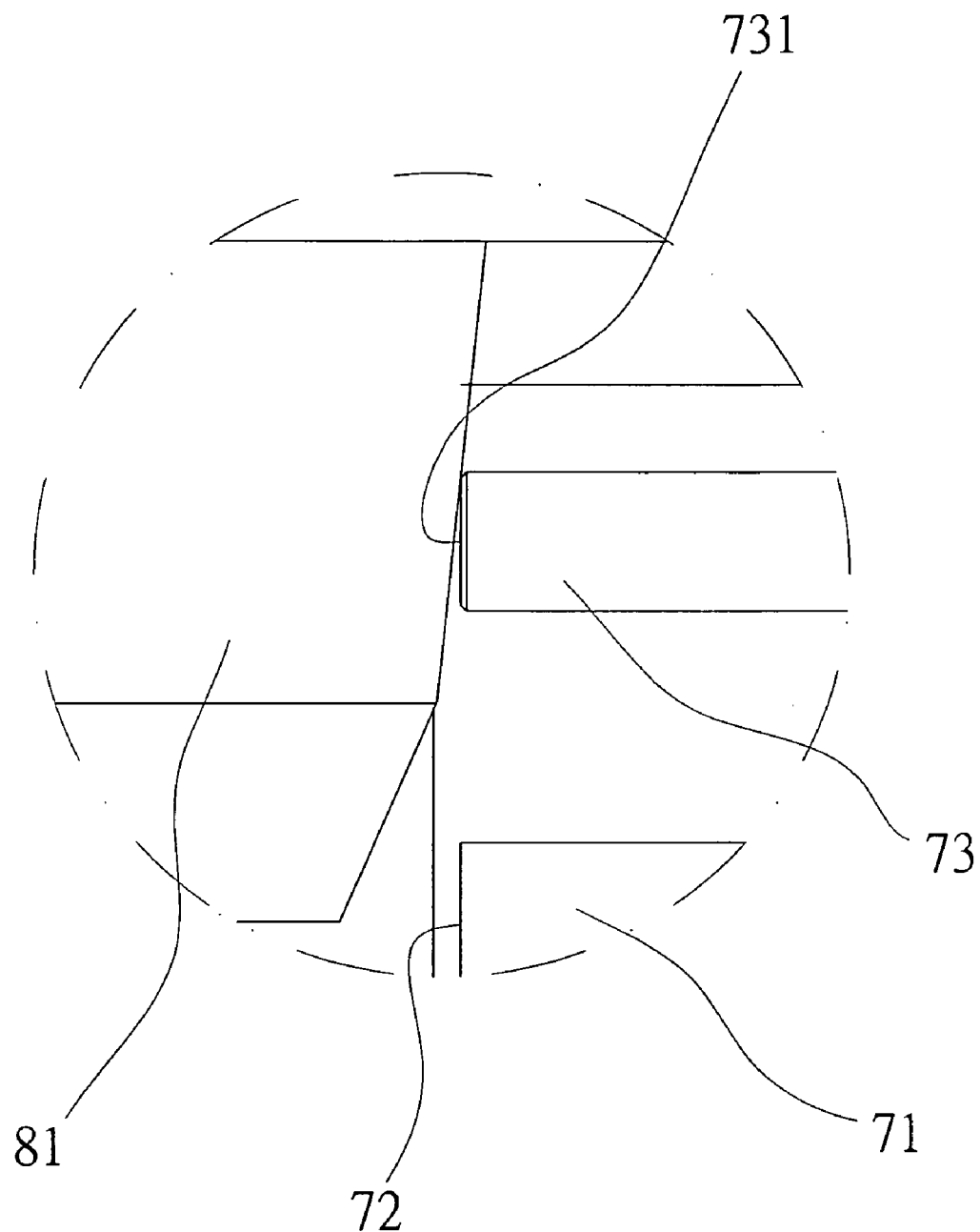
FIG. 10 is an enlarged view to show that the blocks on the mold in FIG. 8 are inserted in the recesses in the connector.

Referring to FIGS. 1 to 4, the chuck device for electrical discharge machine of the present invention comprises a connector 10 having a top 11 and a connection rod 12 extends from the top 11 of the connector 10. The connection rod 12 has a neck 121. A plurality of protrusions 20 extend from the top 11 of the connector 10 and encloses the connection rod 12.

Each protrusion 20 has a groove 21 defined in a top thereof and each groove 21 is defined by two facing inclined surfaces 22. The width of each groove 21 gradually widens toward upward.

A mold 30 has a plurality of receiving grooves 32 defined in an underside thereof and each receiving groove 32 has a positioning bar 40 fixedly engaged therewith. Each positioning bar 40 has a taper-shaped body 42 and two flanges 41 extend from two sides of the positioning bar 40. A width between the two flanges 41 is wider than a width of the taper-shaped body 42. Each positioning bar 40 includes a sink hole 43 defined in the underside thereof and a bolt 44 extends through the sink hole 43 and is connected to the mold 30. The taper-shaped body 42 includes two inclined sides 421.

The connection rod 12 is inserted into a central hole 31 in the mold 30 and the positioning bars 40 are engaged with the grooves 21 respectively. The two inclined sides 421 of each of the positioning bars 40 are in contact with the inclined surfaces 22 of the groove 21 corresponding thereto. It is noted that a gap is defined between an inner side of the groove 21 and an underside of the taper-shaped body 42, and a distance is defined between the flanges 41 and a top of the protrusion 20.

When an unusual situation happens to the discharge head (not shown) connected to the connector 10, the neck 121 is broken. Due to the distance between the flanges 41 and the protrusion 20, the taper-shaped bodies 42 can be slid along the inclined surfaces 22 of the grooves 21 to separate the connector 10 and the mold 30.

The contact areas between the inclined sides 421 of the taper-shaped bodies 42 and the inclined surfaces 22 of the grooves 21 are large enough such that the neck 121 can bear larger force. By this way, the neck 121 does not break often.

While we have shown and described the embodiment in accordance with the present invention, it should be clear to those skilled in the art that further embodiments may be made without departing from the scope of the present invention.

What is claimed is:

1. A chuck device for electrical discharge machine, comprising:
    a connector having a top and a connection rod extending from the top of the connector, the connection rod having a neck, a plurality of protrusions extending from the top of the connector and enclosing the connection rod, each protrusion having a groove defined in a top thereof and each groove defined by two facing inclined surfaces, and
    a mold having a plurality of positioning bars fixed to an underside thereof and each positioning bar having a taper-shaped body and two flanges extending from two sides of the positioning bar, a width between the two flanges being wider than a width of the taper-shaped body, the taper-shaped body including two inclined sides, the positioning bars being engaged with the grooves and the two inclined sides of each of the positioning bars being in contact with the inclined surfaces of the groove corresponding thereto, a gap defined between an inner side of the groove and an underside of the taper-shaped body, a distance being defined between the flanges and a top of the protrusion.

2. The chuck device as claimed in claim 1, wherein each positioning bar includes a sink hole defined in the underside thereof and a bolt extends through the sink hole and is connected to the mold.

* * * * *